N. DYMENBERG.
MOUSE TRAP.
APPLICATION FILED DEC. 16, 1912.
1,058,224.
Patented Apr. 8, 1913.
2 SHEETS—SHEET 1.
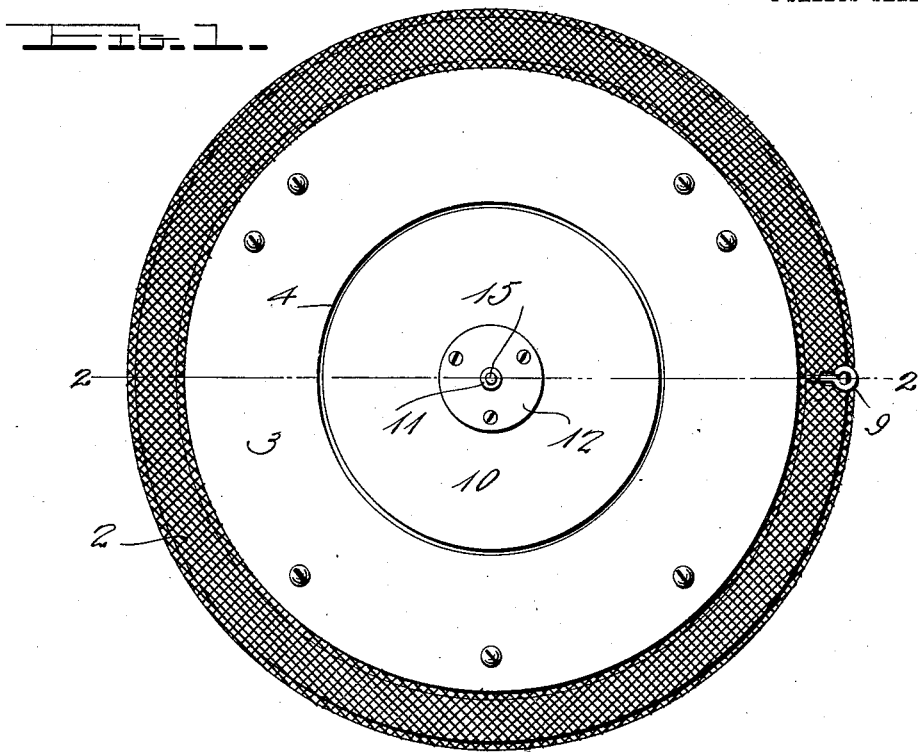
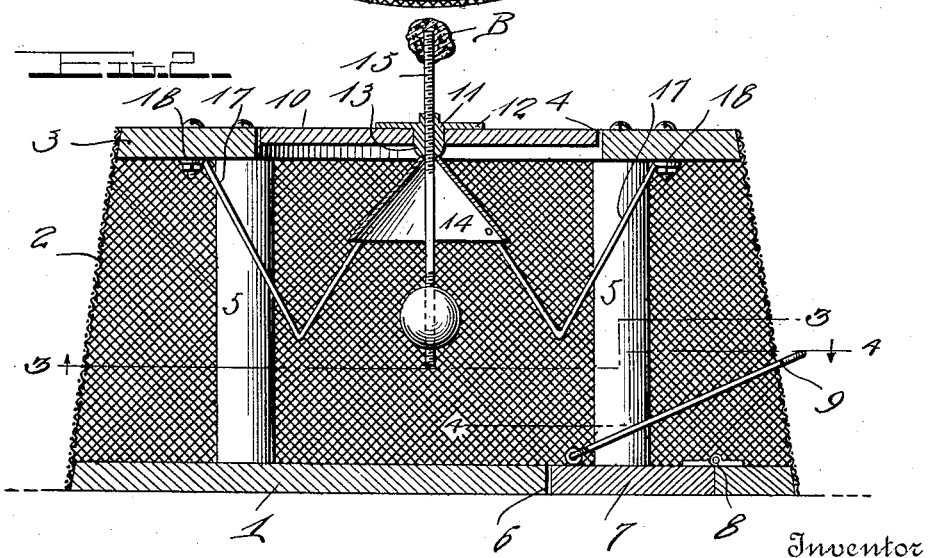
Witnesses
Inventor
N. Dymenberg,
by H. B. Willson & Co.
Attorneys N. DYMENBERG.
MOUSE TRAP.
APPLICATION FILED DEC. 16, 1912.
1,058,224.
Patented Apr. 8, 1913.
2 SHEETS—SHEET 2.
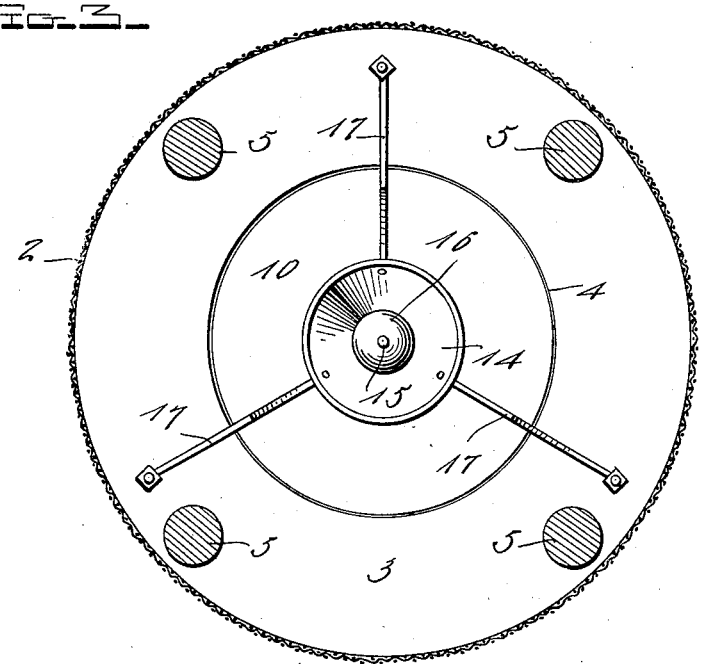
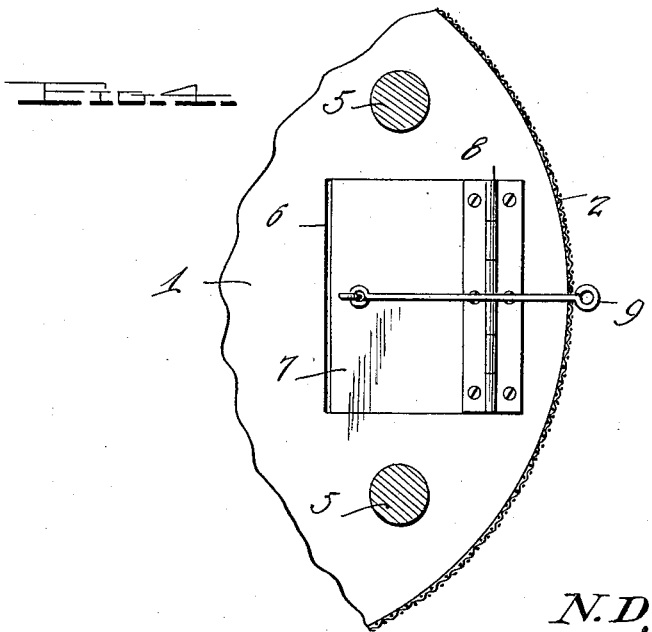
Witnesses
Inventor
N. Dymenberg,
By H. B. Willson & Co.
Attorneys

UNITED STATES PATENT OFFICE.

NOA DYMENBERG, OF BRUSH, COLORADO.

MOUSE-TRAP.

1,058,224.    Specification of Letters Patent.    Patented Apr. 8, 1913.

Application filed December 16, 1912. Serial No. 737,090.

*To all whom it may concern:*

Be it known that I, NOA DYMENBERG, a citizen of the United States, residing at Brush, in the county of Morgan and State of Colorado, have invented certain new and useful Improvements in Mouse-Traps; and I do declare the following to be a full, clear, and exact description of the invention, such as will enable others skilled in the art to which it appertains to make and use the same.

This invention relates to fishing and trapping, and more especially to traps which are ever set; and the object of the same is to produce a trap for mice or other small animals which permits the victim to fall through the top of the trap into the cage beneath, and then sets itself ready for another victim. This object is carried out by constructing the trap in the manner hereinafter more fully described and claimed, and as shown in the drawings wherein—

Figure 1 is a plan view of this improved trap complete, and Fig. 2 is a vertical section on the line 2—2 of Fig. 1. Fig. 3 is a horizontal section looking upward, taken on the line 3—3 of Fig. 2, and Fig. 4 is a sectional detail looking downward, taken on the line 4—4 of Fig. 2.

In the drawings the numeral 1 designates a base which may be of wood and in the present instance is shown as circular, and the numeral 2 designates the body which in the present instance is in the shape of a truncated cone and of wire netting secured around the edges of the base.

The numeral 3 designates the top which may also well be of wood and in the present case is made circular and somewhat smaller than the base, and this top has a large opening 4 in its center whereby it assumes the shape of a ring, being supported from the base by posts 5. Through the base is preferably formed an opening 6 closed by a door 7 hinged to the base at 8, and this door may be drawn open by means of a wire handle 9 which extends through the side 2 and into convenient reach. However, any other suitable form of outlet door may be substituted whereby the animals caught in this trap can be removed therefrom from time to time. The inlet to the trap is through its top. By preference this comprises a circular piece or disk 10, as of light wood or metal, slightly smaller than the opening 4 and centered accurately therein, and through the center of the disk is secured a nut 11, preferably having a flange 12 as seen in Fig. 2, the lower end of the nut being rounded as at 13 and projecting slightly below the lower face of the disk 10.

The numeral 14 designates a hollow cone whose apex is pierced with a hole through which passes a rod 15 which extends to a point within the cage considerably below the cone and carries a weight 16, preferably mounted adjustably thereon by means of the threads as shown; and the rod also extends above the apex of the cone and is threaded through the nut 11 so that it is also adjustable therein. The tip of this rod may carry the bait B. The cone 14 is held within the cage and beneath the center of the opening 4, by means of light wire brackets 17 which preferably make a downward angle between the points where they connect with the cone and their outer ends 18 which have eyes secured within the top 3 as shown—these angles permitting the cover to tilt to a considerable extent as described below.

The parts of this device are of the desired sizes, shapes, proportions and materials; and its operation is as follows: A mouse or other small animal approaches and climbs upon the top of the cage, and scenting the bait B it steps over onto the disk 10 which stands normally horizontal as seen in Fig. 2, and its weight immediately tips or tilts the same so that the rounded lower end 13 of the nut 11 rocks on the apex of the cone, and the animal is precipitated through the opening 4 and falls into the body of the cage. The disk 10 immediately resumes its normal position, in which it is level with the flat top 3 of the cage, and the latter is therefore again set for catching another animal. From time to time the victims caught may be removed through the door 7 as above suggested.

What is claimed as new is:

1. The herein described cage whose body has a flat top provided with a large opening; combined with a disk loosely filling said opening, an upright rod through the center of the disk and adapted to carry the bait on its upper end, a weight on the lower end of the rod, a cone within the body of the cage and through whose apex said rod passes loosely, and means for supporting said cone.

2. The herein described cage whose body has a flat top provided with a large opening; combined with a disk loosely filling said opening, an upright rod through the center of the disk and adapted to carry the bait on its upper end, a weight on the lower end of the rod, a cone standing within the body of the cage and through whose apex said rod passes loosely, and brackets having their inner ends secured to the cone, their bodies deflected into downwardly projecting angles, and their outer ends rising and attached to the lower face of the top of the cage-body.

3. In a trap, the combination with a body having a round opening in its top, a disk loosely fitting said opening, and a nut fast through the center of said disk and having a rounded projection extending below it; of a rod threaded through said nut and adapted to carry the bait at its upper end, a weight adjustably mounted on the lower end of said rod, a cone whose apex is pierced with an opening through which said rod passes loosely, such apex supporting the rounded lower end of the nut, and means for holding said cone suspended within the cage body.

In testimony whereof I have hereunto set my hand in presence of two subscribing witnesses.

NOA DYMENBERG.

Witnesses:
LEONARD E. ANDERSON,
CARL KJELDGAARD.

---

Copies of this patent may be obtained for five cents each, by addressing the "Commissioner of Patents, Washington, D. C."